(12) United States Patent
Aghayee et al.

(10) Patent No.: US 11,665,324 B2
(45) Date of Patent: May 30, 2023

(54) HIGH FIDELITY CONFIGURATION FOR TWO-PHOTON SLM MICROSCOPY

(71) Applicant: University of Maryland, College Park, College Park, MD (US)

(72) Inventors: Samira Aghayee, Washington, DC (US); Mitchell Weikert, Lafayette Hill, PA (US); Wolfgang Losert, Bethesda, MD (US); Patrick Kanold, Bethesda, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 827 days.

(21) Appl. No.: 16/533,330

(22) Filed: Aug. 6, 2019

(65) Prior Publication Data
US 2020/0045271 A1    Feb. 6, 2020

Related U.S. Application Data

(60) Provisional application No. 62/715,055, filed on Aug. 6, 2018.

(51) Int. Cl.
| | |
|---|---|
| *H04N 9/31* | (2006.01) |
| *G03B 21/20* | (2006.01) |
| *G03B 21/14* | (2006.01) |
| *G03H 1/02* | (2006.01) |

(52) U.S. Cl.
CPC ......... *H04N 9/3141* (2013.01); *G03B 21/142* (2013.01); *G03B 21/208* (2013.01); *G03B 21/2033* (2013.01); *G03H 2001/0224* (2013.01); *G03H 2223/13* (2013.01)

(58) Field of Classification Search
CPC ............... H04N 9/3141; G03B 21/142; G03B 21/2033; G03B 21/208; G03H 2001/0224; G03H 2223/13
See application file for complete search history.

(56) References Cited

U.S. PATENT DOCUMENTS

| | | | |
|---|---|---|---|
| 7,067,784 B1 * | 6/2006 | Lowans | G06V 10/88 250/226 |
| 9,018,562 B2 * | 4/2015 | Dantus | B23K 26/382 219/121.76 |

(Continued)

FOREIGN PATENT DOCUMENTS

| | | | | |
|---|---|---|---|---|
| CN | 101799590 A | * | 8/2010 | G02B 26/06 |
| EP | 2527929 A1 | * | 11/2012 | G02B 27/46 |

(Continued)

*Primary Examiner* — Magda Cruz
(74) *Attorney, Agent, or Firm* — Quarles & Brady LLP

(57) ABSTRACT

A method for displaying a modified phase mask on a spatial light modulator (SLM), including: modifying, by a processor, a phase mask by combining the phase mask with a virtual lens pattern, the virtual lens pattern having a focal length; displaying, by the SLM in communication with the processor, the modified phase mask on the SLM; and projecting, by a light source in communication with the processor, the light source through the SLM to form an intensity pattern at a distance from the SLM corresponding to the focal length of the virtual lens pattern, the intensity pattern being based on the phase mask.

18 Claims, 7 Drawing Sheets

(56) References Cited

U.S. PATENT DOCUMENTS

| | | | | |
|---|---|---|---|---|
| 2016/0033874 A1* | 2/2016 | Tang | ................ | G02B 21/0024 |
| | | | | 359/291 |
| 2016/0301914 A1* | 10/2016 | Shechtman | ........ | G02B 21/0056 |
| 2017/0085846 A1* | 3/2017 | Damberg | ............ | H04N 9/3188 |
| 2017/0138851 A1* | 5/2017 | Ashrafi | ................ | G01N 21/21 |
| 2017/0371248 A1* | 12/2017 | Tang | ................ | G03F 7/70025 |
| 2018/0181063 A1* | 6/2018 | Popov | .................. | G02B 30/25 |
| 2019/0204783 A1* | 7/2019 | Kim | .................... | G03H 1/2205 |

FOREIGN PATENT DOCUMENTS

| | | | | | |
|---|---|---|---|---|---|
| GB | 2448132 A | * | 10/2008 | ............ | G02B 26/06 |
| GB | 2493517 A | * | 2/2013 | .......... | G02B 27/102 |
| GB | 2547926 A | * | 9/2017 | ......... | G02B 27/0101 |

* cited by examiner

HIGH FIDELITY CONFIGURATION FOR TWO-PHOTON SLM MICROSCOPY

CROSS-REFERENCE TO RELATED APPLICATIONS

This application claims the benefit of U.S. Provisional Patent Application Ser. No. 62/715,055 filed on Aug. 6, 2018, and entitled "High Fidelity Configuration for Two-Photon SLM Microscopy," which is incorporated by reference herein in its entirety.

STATEMENT REGARDING FEDERALLY SPONSORED RESEARCH

This invention was made with government support under U01NS090569A awarded by the National Institutes of Health. The government has certain rights in the invention.

BACKGROUND

Phase-only Spatial Light Modulators (SLM) have been employed in various applications, including adaptive optics, optical trapping, and photo-stimulation of selective neurons in the brain, due to their ability to modify the light wave front at a relatively high speed and to form any desired illumination pattern. Most of these applications rely on the formation of an unadulterated pattern in the intensity plane. However, limitations of SLM assemblies may introduce a variety of artifacts to the light. The primary issue is caused by the unmodulated portion of the light that travels along the 0th order of diffraction. It is common practice to block this portion at the center of the intensity plane where it comes to focus. However, this remedy may cause a partial or complete loss of information in the obstructed portion of the pattern.

SUMMARY OF THE PRESENT DISCLOSURE

Accordingly, presented herein are embodiments of an optical configuration that allows for the separation of the desired intensity pattern from the unmodulated light and the optional removal of the unmodulated light from the light path, for example at the phase plane. As a result, the desired intensity pattern forms intact and with a more uniform intensity. Moreover, it is shown that a number of artifacts induced by the physical limitations of the SLM can be significantly reduced in the target object plane. In addition, the proposed configuration eliminates the need for removing the unmodulated light in most applications such as two-photon applications.

In one embodiment, the invention provides a method for displaying a modified phase mask on a spatial light modulator (SLM), including: modifying, by a processor, a phase mask by combining the phase mask with a virtual lens pattern, the virtual lens pattern having a focal length; displaying, by the SLM in communication with the processor, the modified phase mask on the SLM; and projecting, by a light source in communication with the processor, the light source through the SLM to form an intensity pattern at a distance from the SLM corresponding to the focal length of the virtual lens pattern, the intensity pattern being based on the phase mask.

In another embodiment, the invention provides an apparatus for displaying a modified phase mask on a spatial light modulator (SLM), including: a processor in communication with the SLM and a light source, a memory in communication with the processor having stored thereon a set of instructions which, when executed by the processor, cause the processor to: modify a phase mask by combining the phase mask with a virtual lens pattern, the virtual lens pattern having a focal length, display the modified phase mask on the SLM, and project the light source through the SLM to form an intensity pattern at a distance from the SLM corresponding to the focal length of the virtual lens pattern, the intensity pattern being based on the phase mask.

These and other embodiments, aspects, advantages, and features of the present invention will be set forth in part in the description which follows, and will become apparent to those skilled in the art by reference to the following description of the invention and referenced drawings or by practice of the invention. The accompanying drawings illustrate one or more implementations, and these implementations do not necessarily represent the full scope of the invention.

Figure 1:
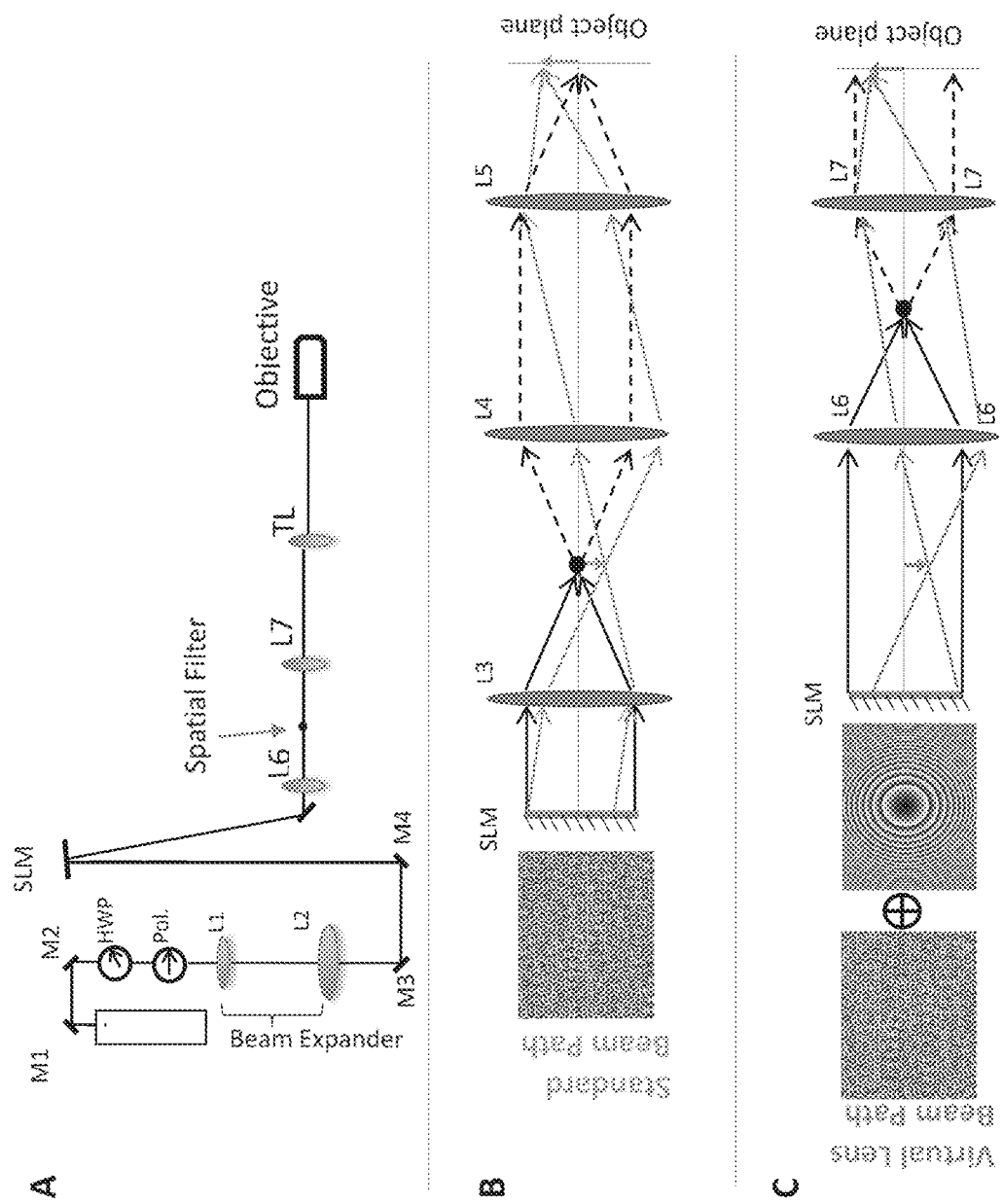
FIG. 1 shows a schematic diagram of an optical configuration according to certain embodiments. Panel A shows a setup with a virtual lens configuration integrated into the optical configuration. Panel B shows a schematic of a standard configuration that keeps the unmodulated and modulated light focused in the same plane (object plane). Panel C shows a schematic of the disclosed virtual lens configuration. Note that in panel C the desired intensity pattern is formed at the back focal plane of the first lens (L6) but the unmodulated light comes in focus at the front focus of L6, where it can be blocked by a spatial filter without blocking any part of the intensity pattern at the object plane.

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents. In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

DETAILED DESCRIPTION OF THE PRESENT DISCLOSURE

Disclosed herein are embodiments of an apparatus, method, and/or system for generating and using a virtual lens as part of an SLM system in order to create and project desired intensity patterns onto a sample while minimizing any detrimental effects caused by zeroth-order, unmodulated light. The disclosed embodiments may be used in various applications, including adaptive optics, optical trapping, and photo-stimulation of selective neurons in the brain, some of which may utilize two-photon microscopy techniques.

In various embodiments one or more desired intensity patterns may be projected onto a sample using an SLM, where a series of such desired intensity patterns may be repeatedly projected in a loop. In certain embodiments the desired light pattern may be generated by displaying a phase mask on the SLM. The phase mask is calculated so as to generate a desired intensity pattern, e.g. an array of dots or lines, when light is displayed on/through the SLM onto the object plane. In general, the intensity pattern is a Fourier transform of the phase mask. The phase mask can be calculated using a phase retrieval algorithm with the desired intensity pattern as an input. In one particular embodiment, the phase mask may be modified before it is applied to the SLM, by superimposing the phase mask with a lens pattern (e.g. a Fresnel lens pattern) to generate a modified phase mask that is then displayed on the SLM. A light source may be directed at the SLM while the modified phase mask is displayed on the SLM, and light that is emitted from the illuminated SLM forms the desired intensity pattern in the object plane at a distance from the SLM corresponding to the focal length of the virtual lens pattern, which, although not limited to, can be chosen to be between 40 mm and 500 mm. In general, weaker virtual lenses (i.e. those having longer focal lengths) typically provide higher signal to noise ratio. In addition, light emitted from the SLM includes an unmodulated zeroth-order component that is brought to a focus at the front focal plane of a physical lens (such as lens L6 in panel C of FIG. 1) that is placed in the light path. On the other hand, the desired intensity pattern may be brought to a focus in a different location relative to the SLM, and appropriate placement of lenses in the light path can project the desired intensity pattern onto the object plane (see panel C of FIG. 1).

Accordingly, FIG. 1 shows schematic diagrams of optical configurations according to certain embodiment. In particular, panel A of FIG. 1 shows a setup with a virtual lens configuration, such as that shown in panel C, integrated into the optical configuration. Panel A shows a light source (e.g. a coherent light source such as a laser) directing light onto a first mirror M1 and a second mirror M2 and then through a half-wave plate (HWP) and a polarizer (Pol.), and then to a beam expander including lenses L1 and L2. The light source may generate UV, visible, and/or IR light, depending on the application, and a suitable SLM is selected for use with the particular wavelength range of the light source. From the beam expander the light reflects off a third mirror M3 and a fourth mirror M4 and is then directed to a phase-only spatial light modulator (SLM) In general, the SLM serves as a phase mask and thus in various embodiments a phase modulating SLM (either transmissive or reflective) may be used for the apparatus, methods, and/or systems disclosed herein. In some embodiments, a stationary phase mask can also be used. In certain embodiments, two or more SLMs can be combined, e.g. a transmissive SLM may be imaged on a second SLM, to achieve the same concept. From the SLM the light may be directly or indirectly (e.g. via an additional mirror) transmitted through a lens L6 to lens L7 and finally to tube lens TL and an objective lens. As shown in panels A-C of FIG. 1, a spatial filter may be placed at the front focal plane of a downstream lens (e.g. following lens L6 in panels A and C and following lens L3 in panel B) to block the zeroth-order light. Variations on the optical configurations of FIG. 1 are also possible.

Panel B of FIG. 1 shows a conventional optical configuration for holographic microscopy. In the conventional configuration shown in panel B, the SLM displays a phase-mask corresponding to a desired intensity pattern that will primarily form in the front focal plane of lens L3. As shown in the schematic, the pattern formed in this plane is confocal to the object plane. Lens L3 also focuses the unmodulated light to the optical axis of this same plane and therefore yields a bright spot in the object plane at the center of the SLM field of view. If it is not blocked, the unmodulated light can yield an intensity of about tens to a few hundred times more than target points, depending on the phase mask that is used.

In order to remove this bright spot from the field of view, a spatial filter may be placed on the optical axis in the front focal plane of L3. As shown in panel B of FIG. 1, unmodulated light leaves the SLM and is focused by lens L3 (solid black arrows). The dashed black arrows show the path that the unmodulated light would have taken if it had not been blocked, which generally would be to come to focus in the object plane. The solid gray arrows show the path taken by the light corresponding to the intensity pattern generated by the SLM, which also comes to a focus in the object plane. The spatial filter, while blocking the unmodulated light, also results in the loss of any optical signal in a vicinity around the center of the SLM field of view at the object plane of the microscope, such that the blocked region is optically inaccessible.

Thus, disclosed herein are configurations which resolve the issue of lost optical signal in such a way that unmodulated light may be blocked while minimizing blockage of the phase-mask projected from the SLM. In various embodiments, the disclosed configuration can also result in obtaining more uniform intensity patterns at the object plane while reducing the ghost patterns that will form due to the limitations of the SLM.

Figure 2:
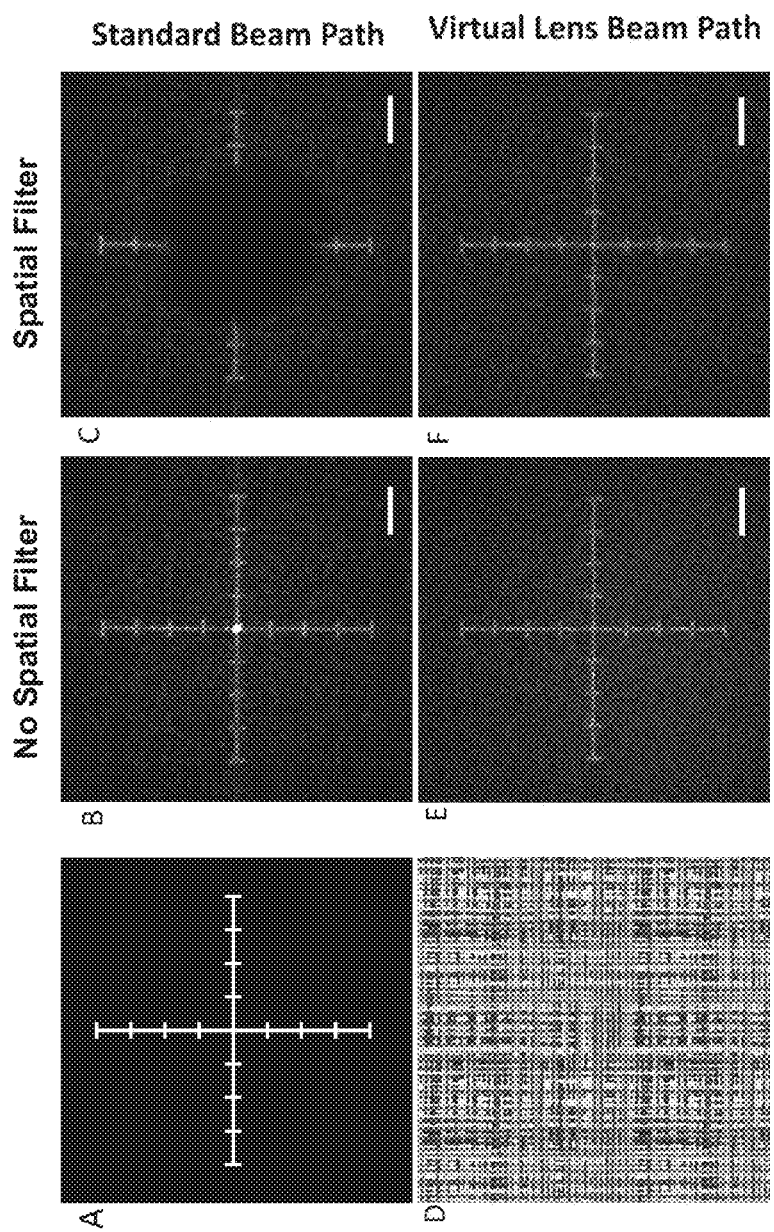
FIG. 2 shows a general comparison between the conventional configuration and the disclosed configuration with or without blocking the unmodulated light. Panel A shows the desired intensity pattern associated with the phase mask shown in panel D. Panel B shows the resulting intensity pattern in the conventional path without blocking the unmodulated light, where the unmodulated light is the bright spot at the center of the pattern. Panel C shows the intensity pattern after blocking the unmodulated light in a conventional light path, where it can be seen that, since the unmodulated and modulated light are coming to focus on the same plane, blocking the unmodulated light prevents generation of an intensity pattern in the central region of the object plane. Panel D shows the phase mask that leads to the intensity pattern shown in panel A. This phase mask would be directly displayed on the SLM in a conventional optical path such as that shown in FIG. 1, panel B; however, in the disclosed arrangement a virtual lens such as a Fresnel lens with a modulus of $2\pi$ is added to this phase mask. Panel E shows the generated intensity pattern obtained in the disclosed configuration with a virtual lens without blocking the unmodulated light. Panel F shows that an intensity pattern can be generated everywhere in the object plane even when the unmodulated light is blocked; the minimal differences between the intensity patterns in the unblocked (panel E) and blocked (panel F) case shows that blocking unmodulated light does not significantly alter the intensity pattern generated by the phase mask in the object plane.

In general, combining the phase mask for the desired intensity pattern with a virtual lens causes the intensity pattern and the unmodulated light to each come to a focus at different locations in the optical pathway. Thus, the unmodulated light may be blocked at a focal plane that is separated from the focal plane of the intensity pattern. In some embodiments the virtual lens is based on a Fresnel lens pattern. In one embodiment (FIG. 1, panel C), the SLM displays a phase mask that is a modular sum of the desired pattern and a Fresnel lens pattern using a modulus of $2\pi$. In general, such calculations (which tend to be faster than the refresh rate of the SLM) can be performed ahead of time/offline or online using a computing system. Modular arithmetic is used for this implementation since each pixel of the SLM can delay the beam phase by a limited amount. Although in the present example a modulus of $2\pi$ is used, the maximum modulus is the maximum phase delay capacity per pixel of the SLM. The Fresnel lens pattern imitates the wavefront phase modulation of a lens with a focal length that can be selected based on the design of the optical path that follows. The distance between the SLM surface displaying the virtual (e.g. Fresnel-based) lens and lens L6 is established such that the resulting intensity pattern will form in a distance $F_{VL}$ from the SLM in the back focal plane of lens L6. In the configuration shown in panel C of FIG. 1, the back focal plane of lens L6 is conjugate to the object plane in order to create localized intensity patterns in the sample. On the other hand, the unmodulated light is focused in the front focal plane of lens L6, conjugate to that of the SLM surface and not in the intensity plane. Therefore, the unmodulated light can be removed by placing a spatial filter at the front focal plane of lens L6 while all the points in the SLM's field of view remain optically accessible. The resulting intensity patterns in each of the paths discussed is shown in FIG. 2.

Since the unmodulated light is collimated in the sample plane after the objective in the proposed configuration and the intensity is therefore distributed in the entire SLM's field of view instead of focusing to a point, in some applications (e.g. optical trapping, two-photon SLM microscopy, etc.), it may not be necessary to block the unmodulated light when it comes to focus ($F_{L6}$). Instead, the unblocked, unmodulated light falls evenly across the object plane in the configuration shown in panel C of FIG. 1 and in certain embodiments may be disregarded. Nevertheless, for those embodiments in which the unmodulated light is blocked at the front focus of lens L6, blocking will remove a small portion of the optical power from the entire intensity pattern in an approximately uniform manner but does not completely block any features of it.

Figure 3:
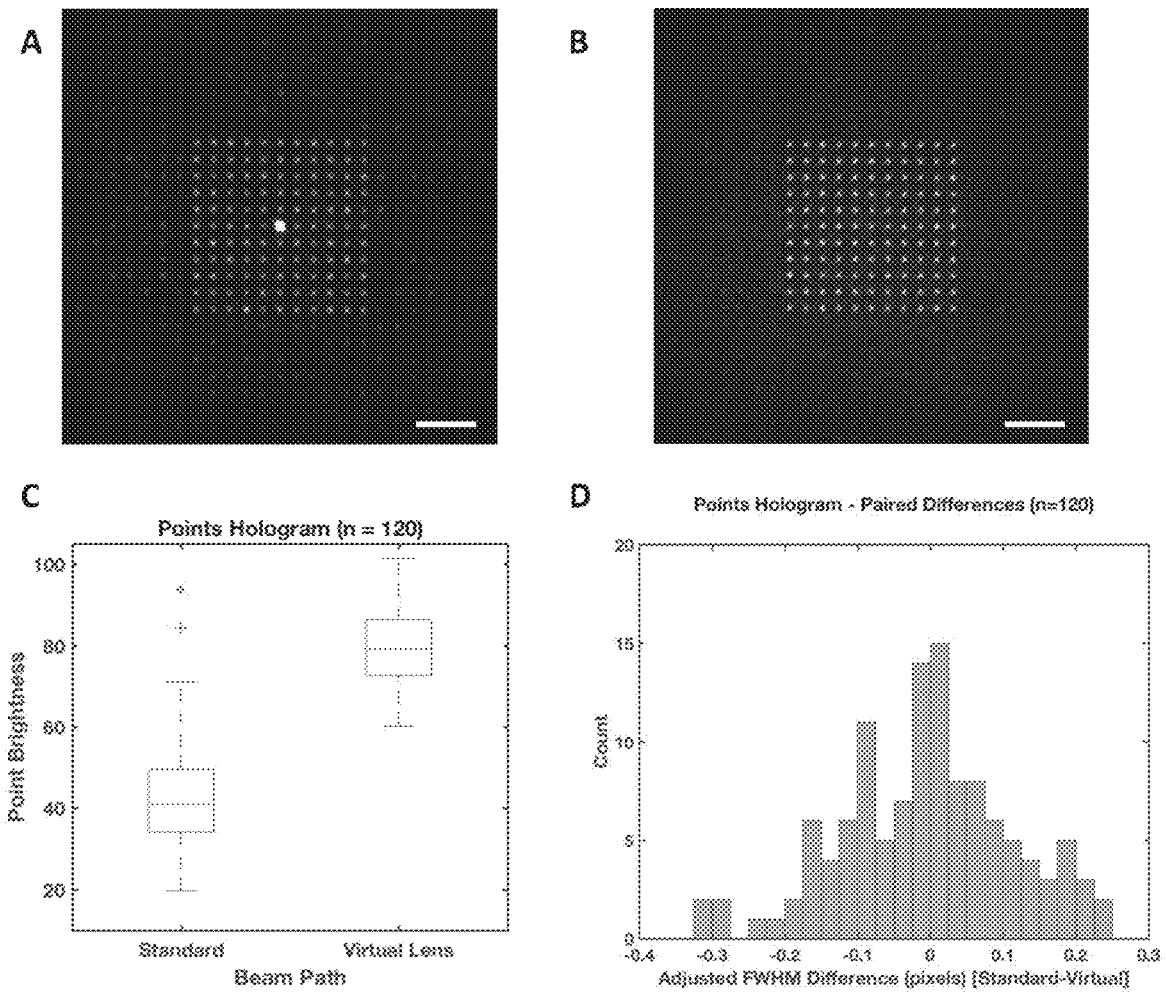
FIG. 3 shows a comparison of the intensity profile of point patterns across the two beam paths. The unmodulated light is not blocked for this experiment and is excluded from the analysis. Panel A shows the desired intensity pattern in the conventional configuration, where the intensity of the points varies significantly. Panel B shows the desired intensity pattern in the disclosed configuration, where the points appear more uniform in brightness. Panel C shows brightness comparison of the points in two beam paths. Panel D shows a histogram of the point-by-point adjusted FWHM difference between the intensity profiles generated using the standard (panel A) or virtual lens (panel B) beam paths.
Figure 4:
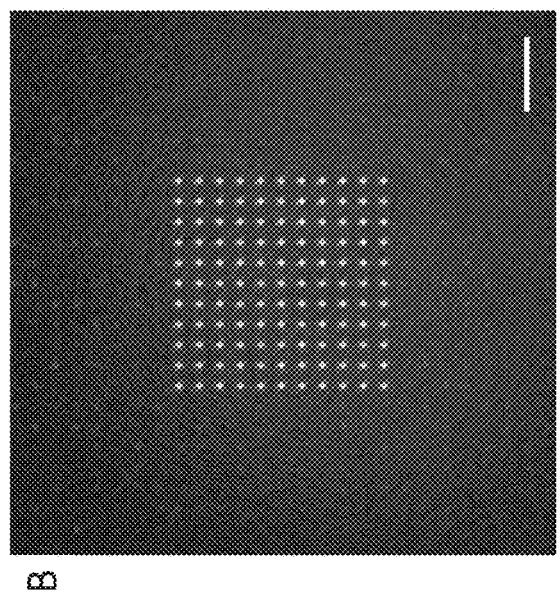
FIG. 4 shows ghost patterns which may form in the intensity plane. The gamma curve for the grayscale has been modified for better viewing in the image. The generated target points (the 11×11 grid of dots in the center of each image) along with the unwanted ghost points (the fainter dots outside of the 11×11 grid in each image) are shown in panel A in the standard path and in panel B using the disclosed virtual lens path. The ratio of the lowest intensity target point to the highest intensity ghost point is 1.2 for the standard path and 5.1 for the virtual lens path, respectively, showing that the virtual lens generates more distinct point patterns that stand out against fainter ghost points.
Figure 4:
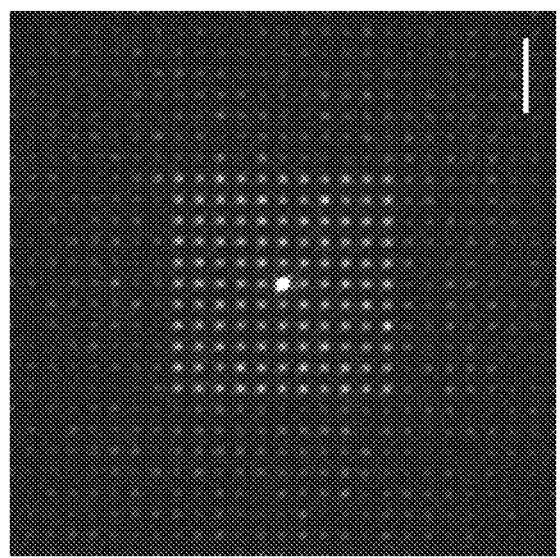

In addition to reducing or removing the unmodulated light pattern, experiments show that the disclosed configuration makes the features in the holographic image have a more uniform intensity than in the standard configuration (FIG. 3) and may reduce or remove undesired features (e.g. ghost patterns) that appear in the object plane where the intensity pattern forms in the standard configuration (FIG. 4). Thus, FIGS. 3 and 4 show that the disclosed virtual lens configurations provide improvements to the signal delivered by the SLM, even when the unmodulated light is not blocked.

FIG. 3 shows a comparison of the intensity profile of point patterns across the two beam paths. The unmodulated light is not blocked for this experiment and is disregarded (excluded) from the analysis. Panel A of FIG. 3 shows the desired intensity pattern using the conventional configuration, where the intensity of the points varies significantly. Panel B of FIG. 3 shows the desired intensity pattern generated using the disclosed configuration, where the points appear more uniform in brightness. Panel C of FIG. 3 shows brightness comparison of the points in two beam paths. Panel D of FIG. 3 shows a histogram of the point-by-point adjusted FWHM difference between the intensity profiles generated using the standard (panel A) or virtual lens (panel B) beam paths.

FIG. 4 shows undesired ghost patterns which may be present in the object plane, where the gamma curve for the grayscale has been modified for better viewing in the image. The target points (the 11×11 grid of dots in the center of each image) along with the undesired ghost points (the fainter dots outside of the 11×11 grid in each image) are shown in panel A in the standard path and in panel B using the disclosed virtual lens path. The ratio of the lowest intensity target point to the highest intensity ghost point is 1.2 for the standard path and 5.1 for the virtual lens path, respectively, showing that the virtual lens generates more distinct target points that stands out against a fainter ghost pattern. It may be important in certain applications to remove undesired features as these may degrade light-sensitive samples if the ghost patterns have significant intensity compared to the target points.

Figure 5:
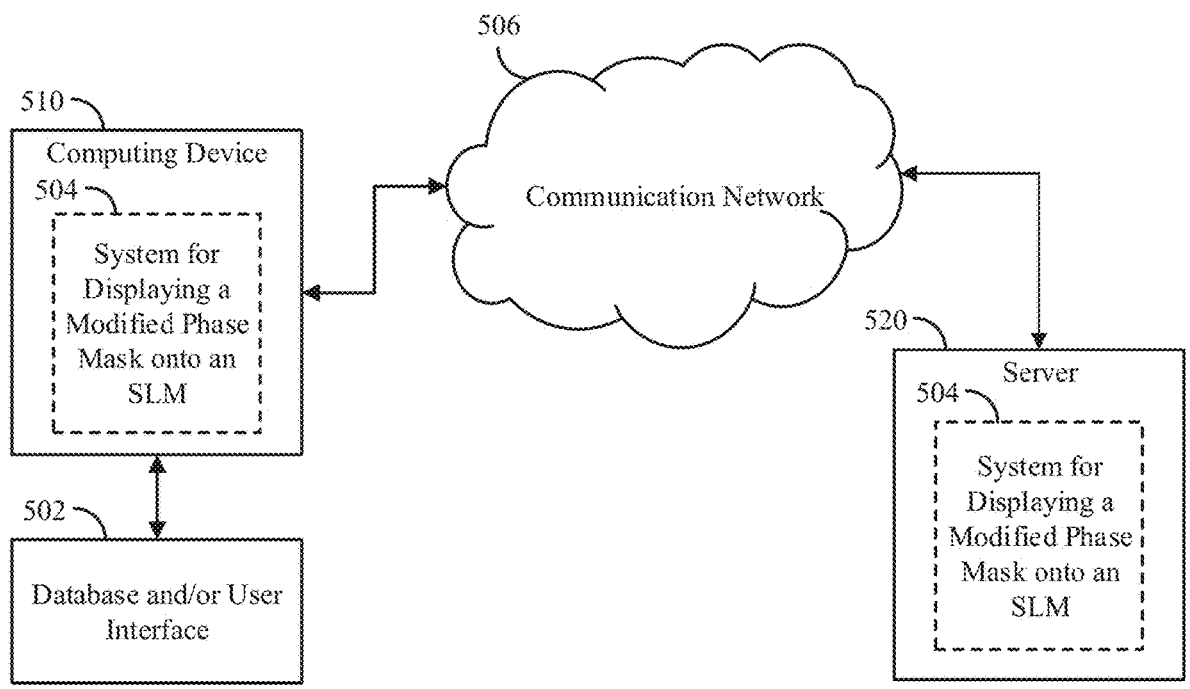
FIG. 5 shows an example of a system for displaying a modified phase mask on an SLM in accordance with some embodiments of the disclosed subject matter.

Turning to FIG. 5, an example 500 of a system for displaying a modified phase mask on an SLM is shown in accordance with some embodiments of the disclosed subject matter. As shown in FIG. 5, a computing device 510 can receive information regarding a virtual lens and/or a desired intensity pattern for generating the modified phase mask from a database and/or user interface 502. In some embodiments, computing device 510 can execute at least a portion of a system for displaying a modified phase mask on an SLM 504 to determine the modified phase mask based on the virtual lens and/or the desired intensity pattern received from the database and/or user interface 502. Additionally or alternatively, in some embodiments, computing device 510 can communicate information about the virtual lens and/or the desired intensity pattern received from the database and/or user interface 502 to a server 520 over a communication network 506, which can execute at least a portion of system for displaying a modified phase mask on an SLM 504 to determine the modified phase mask based on the virtual lens and/or desired intensity pattern. In some such embodiments, server 520 can return information to computing device 510 (and/or any other suitable computing device) indicative of an output of system for displaying a modified phase mask on an SLM 504, such as a signal obtained from a sample that is illuminated by output from the SLM. This information may be transmitted and/or presented to a user (e.g. a researcher, an operator, a clinician, etc.) and/or may be stored (e.g. as part of a research database or a medical record associated with a subject).

In some embodiments, computing device 510 and/or server 520 can be any suitable computing device or combination of devices, such as a desktop computer, a laptop computer, a smartphone, a tablet computer, a wearable computer, a server computer, a virtual machine being executed by a physical computing device, etc. As described herein, system for displaying a modified phase mask on an SLM 504 can present information about the virtual lens, the desired intensity pattern, and/or an output of system for displaying a modified phase mask on an SLM 504, such as a signal obtained from a sample that is illuminated by output from the SLM to a user (e.g., researcher and/or physician).

In some embodiments, the light source can be any source that is suitable for use with a modified phase mask that is displayed on an SLM. In some embodiments, the light source may be local to computing device 510. For example, the light source may be incorporated with computing device 510 (e.g., computing device 510 can be configured as part of a device for generating and/or displaying a modified phase mask on an SLM). As another example, the light source may be connected to computing device 510 by a cable, a direct wireless link, etc. so that computing device 510 can control the light source remotely. Additionally or alternatively, in some embodiments, the light source can be located locally and/or remotely from computing device 510, and can be in communication with computing device 510 (and/or server 520) via a communication network (e.g., communication network 506).

In some embodiments, communication network 506 can be any suitable communication network or combination of communication networks. For example, communication network 506 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 506 can be a local area network, a wide area network, a public network (e.g., the Internet), a private or semi-private network (e.g., a corporate or university intranet), any other suitable type of network, or any suitable combination of networks. Communications links shown in FIG. 5 can each be any suitable communications link or combination of communications links, such as wired links, fiber optic links, Wi-Fi links, Bluetooth links, cellular links, etc.

Figure 6:
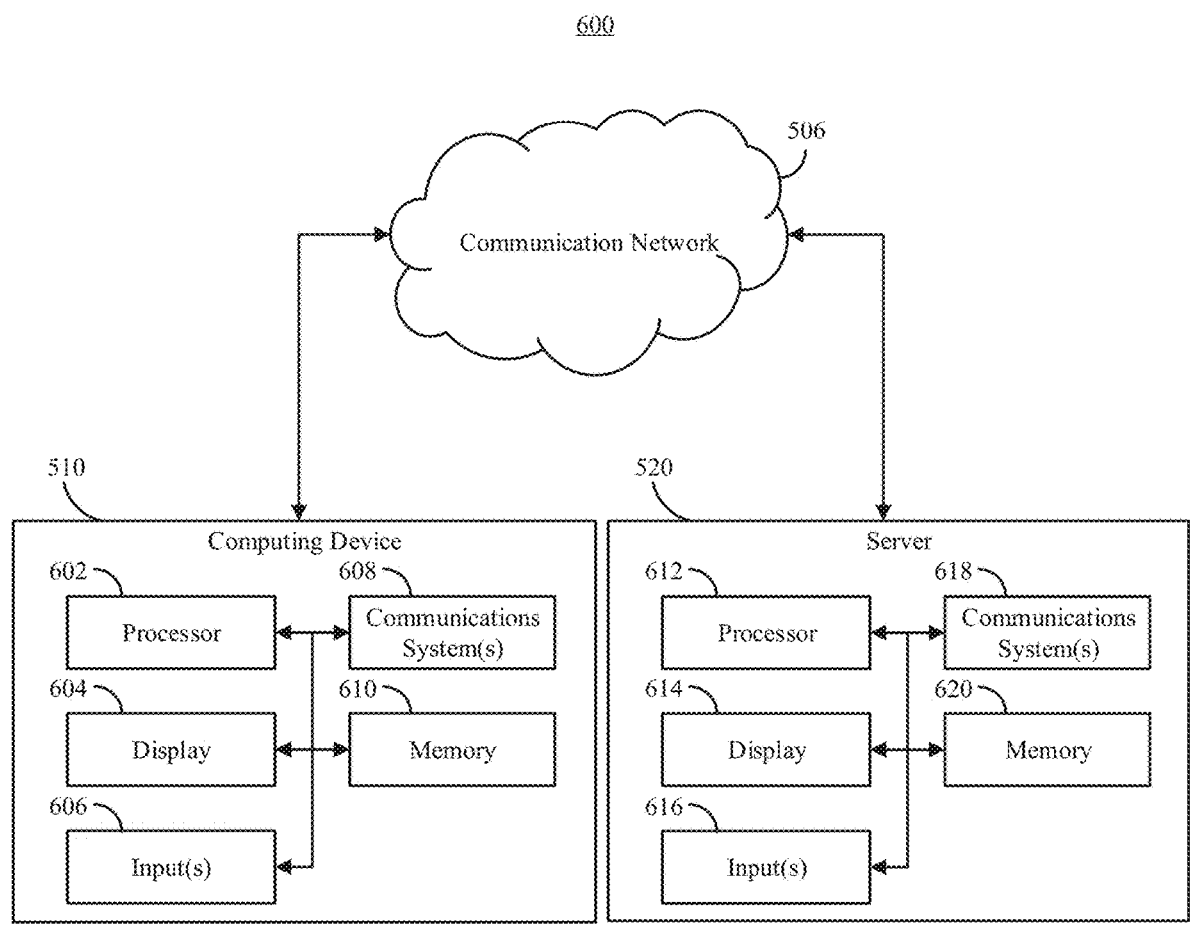
FIG. 6 shows an example of hardware that can be used to implement a computing device and server in accordance with some embodiments of the disclosed subject matter.

FIG. 6 shows an example 600 of hardware that can be used to implement computing device 510 and server 520 in accordance with some embodiments of the disclosed subject matter. As shown in FIG. 6, in some embodiments, computing device 510 can include a processor 602, a display 604, one or more inputs 606, one or more communication systems 608, and/or memory 610. In some embodiments, processor 602 can be any suitable hardware processor or combination of processors, such as a central processing unit, a graphics processing unit, etc. In some embodiments, display 604 can include any suitable display devices, such as a computer monitor, a touchscreen, a television, etc. In some embodiments, inputs 606 can include any suitable input devices and/or sensors that can be used to receive user input, such as a keyboard, a mouse, a touchscreen, a microphone, etc.

In some embodiments, communications systems 608 can include any suitable hardware, firmware, and/or software for communicating information over communication network 506 and/or any other suitable communication networks. For example, communications systems 608 can include one or more transceivers, one or more communication chips and/or chip sets, etc. In a more particular example, communications systems 608 can include hardware, firmware and/or software that can be used to establish a Wi-Fi connection, a Bluetooth connection, a cellular connection, an Ethernet connection, etc.

In some embodiments, memory 610 can include any suitable storage device or devices that can be used to store instructions, values, etc., that can be used, for example, by processor 602 to present content using display 604, to communicate with server 520 via communications system(s) 608, etc. Memory 610 can include any suitable volatile memory, non-volatile memory, storage, or any suitable combination thereof. For example, memory 610 can include RAM, ROM, EEPROM, one or more flash drives, one or more hard disks, one or more solid state drives, one or more optical drives, etc. In some embodiments, memory 610 can have encoded thereon a computer program for controlling operation of computing device 510. In such embodiments, processor 602 can execute at least a portion of the computer program to present content (e.g., images, user interfaces, graphics, tables, etc.), receive content from server 520, transmit information to server 520, etc.

In some embodiments, server 520 can include a processor 612, a display 614, one or more inputs 616, one or more communications systems 618, and/or memory 620. In some embodiments, processor 612 can be any suitable hardware processor or combination of processors, such as a central processing unit, a graphics processing unit, etc. In some embodiments, display 614 can include any suitable display devices, such as a computer monitor, a touchscreen, a television, etc. In some embodiments, inputs 616 can include any suitable input devices and/or sensors that can be used to receive user input, such as a keyboard, a mouse, a touchscreen, a microphone, etc.

In some embodiments, communications systems 618 can include any suitable hardware, firmware, and/or software for communicating information over communication network 506 and/or any other suitable communication networks. For example, communications systems 618 can include one or more transceivers, one or more communication chips and/or chip sets, etc. In a more particular example, communications systems 618 can include hardware, firmware and/or software that can be used to establish a Wi-Fi connection, a Bluetooth connection, a cellular connection, an Ethernet connection, etc.

In some embodiments, memory 620 can include any suitable storage device or devices that can be used to store instructions, values, etc., that can be used, for example, by processor 612 to present content using display 614, to communicate with one or more computing devices 510, etc. Memory 620 can include any suitable volatile memory, non-volatile memory, storage, or any suitable combination thereof. For example, memory 620 can include RAM, ROM, EEPROM, one or more flash drives, one or more hard disks, one or more solid state drives, one or more optical drives, etc. In some embodiments, memory 620 can have encoded thereon a server program for controlling operation of server 520. In such embodiments, processor 612 can execute at least a portion of the server program to transmit information and/or content (e.g., information regarding the virtual lens, the desired intensity pattern, the phase mask, any data collected from a sample that is illuminated, a user interface, etc.) to one or more computing devices 510, receive information and/or content from one or more computing devices 510, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

In some embodiments, the optical signals are detected by photodiodes. It should be recognized that any optoelectronic conversion device including but not limited to photo detectors, photodiodes, line-scan and two-dimensional cameras, and photodiode arrays can be used to perform this detection function. It should be noted that, as used herein, the term mechanism can encompass hardware, software, firmware, or any suitable combination thereof.

Figure 7:
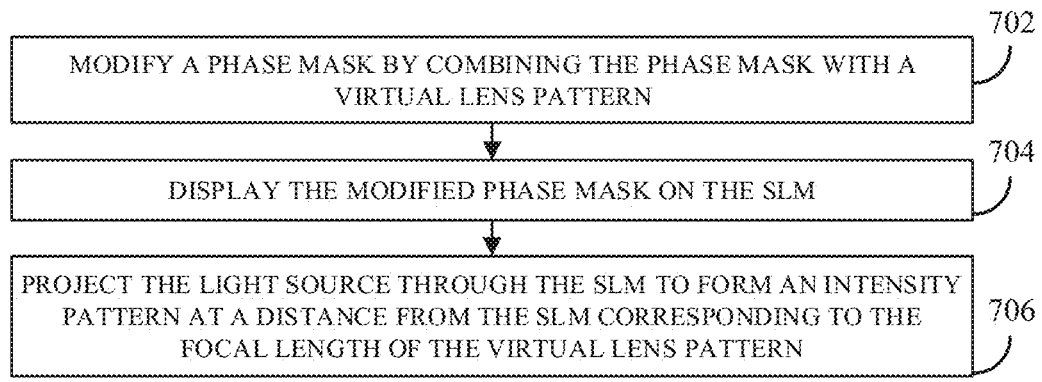
FIG. 7 shows an example of a process for displaying a modified phase mask on an SLM in accordance with some embodiments of the disclosed subject matter.

FIG. 7 shows an example 700 of a process for displaying a modified phase mask on a spatial light modulator (SLM) in accordance with some embodiments of the disclosed subject matter. As shown in FIG. 7, at 702, process 700 can modify, by a processor, a phase mask by combining the phase mask with a virtual lens pattern, where the virtual lens pattern has a focal length. At 704, process 700 can display, by the SLM in communication with the processor, the modified phase mask on the SLM. Finally, at 706, process 700 can project, by a light source in communication with the processor, the light source through the SLM to form an intensity pattern at a distance from the SLM corresponding to the focal length of the virtual lens pattern. The intensity pattern may be based on the phase mask.

It should be understood that the above described steps of the processes of FIG. 7 can be executed or performed in any order or sequence not limited to the order and sequence shown and described in the figures. Also, some of the above steps of the processes of FIG. 7 can be executed or performed substantially simultaneously where appropriate or in parallel to reduce latency and processing times.

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

What is claimed is:

1. A method for displaying a modified phase mask on a spatial light modulator (SLM), comprising:
    modifying, by a processor, a phase mask by combining the phase mask with a virtual lens pattern,
    the virtual lens pattern having a focal length;
    displaying, by the SLM in communication with the processor, the modified phase mask on the SLM; and
    projecting, by a light source in communication with the processor, the light source through the SLM to form an intensity pattern at a first distance from the SLM corresponding to the focal length of the virtual lens pattern,
    the intensity pattern being based on the phase mask, and
    zeroth-order light emitted from the SLM being focused at a second distance from the SLM different from the first distance.

2. The method of claim 1, wherein projecting the light source further comprises:
    projecting the light source through the SLM toward a lens in an output path of the SLM, wherein the intensity pattern is formed at a back focal plane of the lens.

3. The method of claim 2, wherein the virtual lens pattern comprises a Fresnel lens pattern, and
    wherein modifying the phase mask further comprises:
        modifying the phase mask by combining the phase mask with the Fresnel lens pattern.

4. The method of claim 3, wherein combining the phase mask with the Fresnel lens pattern further comprises:
    generating a modular sum of the phase mask and the Fresnel lens pattern.

5. The method of claim 4, wherein generating the modular sum further comprises:
    generating the modular sum using a modulus of $2\pi$.

6. The method of claim 5, further comprising:
    blocking the zeroth-order light by locating a spatial filter at a focal plane of unmodulated light located at the second distance from the SLM.

7. The method of claim 6, wherein blocking the zeroth-order light by locating the spatial filter further comprises:
    blocking the zeroth-order light by locating the spatial filter on an optical axis of the lens.

8. The method of claim 1, wherein the light source comprises a laser.

9. The method of claim 8, wherein the laser comprises an infrared laser.

10. An apparatus for displaying a modified phase mask on a spatial light modulator (SLM), comprising:
    a processor in communication with the SLM and a light source,
    a memory in communication with the processor having stored thereon a set of instructions which, when executed by the processor, cause the processor to:
        modify a phase mask by combining the phase mask with a virtual lens pattern, the virtual lens pattern having a focal length,
        display the modified phase mask on the SLM, and
        project the light source through the SLM to form an intensity pattern at a first distance from the SLM corresponding to the focal length of the virtual lens pattern,
            the intensity pattern being based on the phase mask, and
            zeroth-order light emitted from the SLM being focused at a second distance from the SLM different from the first distance.

11. The apparatus of claim 10, further comprising a lens in an output path of the SLM,
   wherein the processor, when projecting the light source, is further caused by the instructions to:
      project the light source through the SLM toward the lens, wherein the intensity pattern is formed at a back focal plane of the lens.

12. The apparatus of claim 11, wherein the virtual lens pattern comprises a Fresnel lens pattern, and
   wherein the processor, when modifying the phase mask, is further caused by the instructions to:
      modify the phase mask by combining the phase mask with the Fresnel lens pattern.

13. The apparatus of claim 12, wherein the processor, when combining the phase mask with the Fresnel lens pattern, is further caused by the instructions to:
      generate a modular sum of the phase mask and the Fresnel lens pattern.

14. The apparatus of claim 13, wherein the processor, when generating the modular sum, is further caused by the instructions to:
      generate the modular sum using a modulus of $2\pi$.

15. The apparatus of claim 14, wherein the processor is further caused by the instructions to:
      block the zeroth-order light by locating a spatial filter at a front focal plane of the lens.

16. The apparatus of claim 15, wherein the processor, when blocking the zeroth- order light by locating the spatial filter, is further caused by the instructions to:
      block the zeroth-order light by locating the spatial filter on an optical axis of the lens.

17. The apparatus of claim 10, wherein the light source comprises a laser.

18. The apparatus of claim 17, wherein the laser comprises an infrared laser.

* * * * *